(12) United States Patent
Blaschke et al.

(10) Patent No.: US 6,413,563 B1
(45) Date of Patent: *Jul. 2, 2002

(54) READY-TO-BRAKE REFRIGERATED SWEET DOUGH

(75) Inventors: Dieter Blaschke, La Tour-de-Peilz; Peter Nairn, St-Legier, both of (CH); Merrie Martin, New Milford, CT (US); Eugene Scoville, New Milford, CT (US); Jenifer Cramer, New Milford, CT (US); Karl Christian Fuchs, Gaylordsville, CT (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,983

(22) Filed: Aug. 20, 2001

Related U.S. Application Data

(63) Continuation of application No. 09/453,914, filed on Apr. 25, 2000, now Pat. No. 6,280,783, and a continuation-in-part of application No. 09/502,447, filed on Feb. 11, 2000, now Pat. No. 6,284,295, and a continuation-in-part of application No. 09/433,557, filed on Nov. 4, 1999, now Pat. No. 6,312,743, which is a continuation-in-part of application No. PCT/EP99/05821, filed on Aug. 9, 1999, which is a continuation-in-part of application No. 09/130,117, filed on Aug. 6, 1998, now Pat. No. 6,024,997, which is a continuation-in-part of application No. PCT/EP98/03848, filed on Jun. 24, 1998, now abandoned, and a continuation of application No. PCT/EP97/07190, filed on Dec. 17, 1997, now abandoned.

(30) Foreign Application Priority Data

Dec. 19, 1996 (EP) .............................................. 96203630

(51) Int. Cl.⁷ ............................................. A21D 10/02
(52) U.S. Cl. ......................... 426/144; 426/76; 426/94; 426/128; 426/549
(58) Field of Search ........................... 426/128, 76, 94, 426/549, 144

(56) References Cited

U.S. PATENT DOCUMENTS

| | | | |
|---|---|---|---|
| 1,319,899 A | 10/1919 | Rafert | 426/76 |
| 1,929,358 A | 10/1933 | Keefer | 426/76 |

(List continued on next page.)

FOREIGN PATENT DOCUMENTS

| | | |
|---|---|---|
| CA | 1338372 | 6/1996 |
| DE | 94 17 488 | 1/1995 |

(List continued on next page.)

OTHER PUBLICATIONS

Riddle, J.S., "Frookies to Offer Cookies to In–Store Departments," Supermarket News, 40(26):40 (1990).

Brochure from Ready–Bake International titled "Gourmet Cookies" No Date.

Copy of packaging for "Snap to Bake Cookies" manufactured by Pampas, A Division of Quality Bakers Australia Limited No Date.

Primary Examiner—Lien Tran
(74) Attorney, Agent, or Firm—Winston & Strawn

(57) ABSTRACT

A ready-for-use refrigerated sweet dough that is prepared from flour, sugar, a leavening agent and fat. The dough has a surface that includes grooves, score lines, or combinations thereof which define pieces of the dough to be broken off and baked into individual bakery products such as cookies, muffins, brownies, or other pastries. The grooves, score lines, or combinations thereof each have a depth of about 3% to about 95% of the thickness of the dough. The dough is in the form of a sheet or a parallelepipedal, cylinder, prismatic block or polygon having a thickness of from about 0.5 to 5 cm.

22 Claims, 5 Drawing Sheets

U.S. PATENT DOCUMENTS

| | | |
|---|---|---|
| 1,952,698 A | 3/1934 | Willem .............................. 31/5 |
| 3,024,112 A | 3/1962 | Burgess ....................... 426/497 |
| 3,397,064 A | 8/1968 | Matz .............................. 99/90 |
| 3,765,909 A | 10/1973 | Moline ..................... 99/192 R |
| 4,215,104 A | 7/1980 | Ullman et al. ................. 424/15 |
| 4,445,835 A | 5/1984 | Wasserbach ............. 425/131.1 |
| 4,517,209 A | 5/1985 | Thornton et al. ........... 426/383 |
| 4,777,057 A | 10/1988 | Sugisawa et al. ............ 426/412 |
| 4,859,473 A | 8/1989 | Arcisszewski et al. ........ 426/19 |
| 4,900,577 A | 2/1990 | Arciszewski et al. ....... 426/563 |
| 5,049,399 A | 9/1991 | Huang et al. ................. 426/87 |
| 5,171,599 A | 12/1992 | Weber ........................ 426/549 |
| 5,349,759 A | 9/1994 | Anton et al. ................... 33/524 |
| 5,523,107 A | 6/1996 | Wallin ........................ 426/549 |

FOREIGN PATENT DOCUMENTS

| | | |
|---|---|---|
| EP | 0 084 210 | 7/1983 |
| EP | 0 145 550 | 6/1985 |
| EP | 0 214 707 | 3/1987 |
| EP | 0 900 527 A2 | 3/1999 |
| GB | 461263 | 3/1937 |
| WO | WO 90/01877 | 3/1990 |
| WO | WO 92/10101 | 6/1992 |
| WO | WO 97/31539 | 9/1997 |

READY-TO-BRAKE REFRIGERATED SWEET DOUGH

CROSS REFERENCE TO RELATED APPLICATIONS

This application is a continuation of application Ser. No. 09/453,914, filed Apr. 25, 2000, now U.S. pat. No. 6,280,783, which is a continuation-in-part of each of (1) the U.S. national phase of international application PCT/EP99/05821 filed Aug. 9, 1999; (2),U.S. patent application Ser. No. 09/433,557 filed Nov. 4, 1999 now U.S. Pat. No. 6,312,743B1 which is a continuation-in-part of the U.S. national phase of international application PCT/EP98/03848 filed Jun. 24, 1998, now abandoned; and (3) U.S. patent application Ser. No. 09/502,447 filed Feb. 11, 2000 now U.S. Pat. No. 6,284,295B1 which is a continuation-in-part of U.S. patent application Ser. No. 09/130,117 filed Aug. 6, 1998, now U.S. pat. No. 6,024,997, which is a continuation of the U.S. national phase of international application PCT/EP97/07190 filed Dec. 17, 1997, now abandoned. The content of each of these applications is expressly incorporated herein by reference thereto.

FIELD OF INVENTION

The present invention is directed to a ready-for-use refrigerated cookie dough which can be preserved in the refrigerator and which is typically prepared from flour, sugar, a leavening agent, a fat, water and other ingredients. The dough includes score lines thereon which facilitate breaking the dough into smaller pieces for baking into a final product, such as cookies, brownies or muffins.

BACKGROUND ART

Ready-made cookie dough already exists on the market. Typically, the dough is refrigerated and packaged either in a cylindrical shape or packaged in a cup. During use, the consumer uses a spoon or a knife to form the cookie in a circular shape prior to baking. This particular cookie dough preparation requires extensive manipulation of the cookie dough prior to use. If the cookie dough is packaged in the form of a block or sheet, then a forming device is needed in order to give the cookie the desired circular form. This cookie dough manipulation, however, leaves remnants of cookie dough pieces, which must then be recycled and reshaped if desired.

Another conventional product is a frozen cookie dough which is in the form of individual amounts to form single cookies. The amounts are provided by forming dough balls or by cutting the dough into individual pieces. The balls or pieces are then placed adjacent each other on a tray or other support, and are then frozen. The dough pieces, being tacky before freezing, stick to adjacent pieces and freeze into a solid block. During use, the consumer thaws the block and then separates the individual pieces for baking. As the preparation before freezing is somewhat complex, an improvement on these type products is also needed.

SUMMARY OF INVENTION

The present invention relates to a consumer-friendly, ready-to-bake refrigerated cookie dough which requires only a minimum amount of manipulation during use and which advantageously minimizes or eliminates dough pieces that need to be reshaped or recycled. Also, this dough is preformed easily into shapes to assist in the preparation and baking of the product.

The ready-for-use sweet dough can be preserved in the refrigerator. Typically, this dough is prepared from flour, sugar, a leavening agent, and a fat. Additionally, the dough is provided in a form ready for baking having grooves, score lines, or a combination thereof which define pieces of dough that are to be broken off and baked into final products, such as cookies, brownies, muffins, a cake, quick bread, or other pastry or bakery products.

The invention also relates to a method for providing individually baked products comprising the steps of: providing an uncooked dough sheet or block which has separable portions of predefined shape, separating one or more portions from the sheet or block and then baking the portions to obtain individually baked products. Advantageously, the shapes of the portions are defined by grooves, score lines or combinations thereof and the portions are separated from the sheet by breaking them along the grooves or score lines. The grooves or score lines may be intersecting or non-intersecting and substantially straight to define polygonal shaped portions, or at least partially arcuate to define the shape of an object having non-linear features, such as a cartoon character.

The portions may be baked in separate pans which define the final shape and configuration of the individually baked product, or separated portions can be baked in a single pan to facilitate more uniform baking and the portions. Alternatively, the dough may be formulated to flow upon baking and the portions baked on a sheet or pan which allows the portions to flow to form substantially round individually baked products.

BRIEF DESCRIPTION OF THE DRAWINGS

The remainder of the description is made with reference to the drawings which illustrate preferred embodiments wherein.

DETAILED DESCRIPTION OF THE INVENTION

Figure 1:
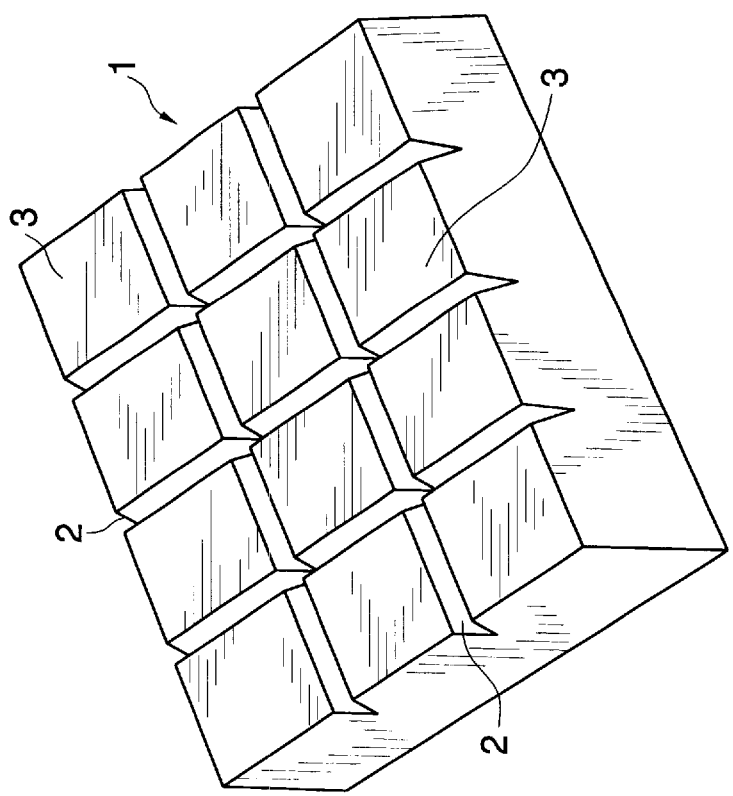
FIG. 1 is a perspective view of a rectangular block of cookie dough prepared with intersecting grooves that define pieces of dough that can be broken off and baked into cookies.

The present invention relates to a new form of pre-mixed or pre-prepared bakery dough products which is ready for baking. The term "bakery dough" is used to mean pre-mixed dough of the types used for making bakery items where the dough is provided in the form of a sufficiently solid or semi-solid block, while the term "sweet dough" refers to dough that contains at least 0.5% by weight of sugar or an artificial sweetener such as saccharine or Nutrasweet. This block is typically provided under frozen conditions, is purchased that way by the consumer, and then is removed from the freezer, thawed if necessary, and then is separated into pieces which are then placed onto a pan or into a baking tin for baking.

The invention includes a number of different embodiments, one of which is exemplified by a cookie dough. It is to be understood that the invention is applicable to other products of similar sweet dough, such as brownies, muffins, turnovers, doughnuts, cakes or other pastries. The cookie dough pieces can be baked on a flat pan in an oven, while other dough, such as brownie dough, a muffin dough or a cobbler dough are baked in a baking tin or in individual forms or cups. For instance, the individual forms can be made of baking paper, aluminum foil or a mold or cup of a tray.

The block is broken into smaller pieces along the score lines provided on the body and preferably on its upper surface so that after baking individual baked items can be made. The dough according to the invention can be provided in any form but the block form is particularly advantageous. This block may be either of parallelepipedal form, or of cylindrical form, or of prismatic form.

The dough according to the invention can have several shapes. Preferably, the dough is shaped into a block or sheet. The block may be either of parallelepipedal shaped, cylindrical shape or prismatic shape. For example, a cookie dough having baking powder in an amount from about 0.1% to about 1.5% can be easily formed into these shapes. Subsequently, the shaped dough is placed on a baking tray and baked. During baking, the dough flows into a substantially circular shape.

In one embodiment, the dough block has an imprint to facilitate breaking the dough into smaller blocks, pieces or portions. The imprint or precut facilitates breaking the frozen, thawed dough prior to baking. The block of dough with an imprint can be broken into smaller blocks by using a knife or by hand. When using a knife, the knife completely cuts the block of dough beyond the imprint. Alternatively, the block of dough can be pulled apart using one's hands. As long as the block of dough has an imprint or a partial cut, the dough blocks can be either cut or broken into smaller size pieces of rectangular, circular, triangular or any other geometric shapes. There is no waste due to shaping and no manipulation, other than cutting or breaking of the dough by the consumer, prior to baking.

The dough typically includes a leavening agent. Any conventional leavening agent can be utilized depending upon the final product and its desired characteristics. One common leavening agent is baking powder, and this is advantageous for preparing dough which flows when baked. This agent at least in part contributes to the ability of the dough pieces to flow into a round bakery product, such as a cookie, during baking.

As used herein, "baking powder" means a mixture of at least one bicarbonate or carbonate salt, at least one acidifying agent and at least one separating agent. These ingredients and adequate substitutes are commonly known to one of ordinary skill in the art, therefore, any known ingredient or substitute can be used with the invention. Preferably, sodium bicarbonate is used with sodium diphosphate or disodium dihydrogen pyrophosphate and a starch as separating agent. These mixtures are directly available commercially with a fixed composition. Typically, a mixture of baking powder comprises bicarbonate in an amount of about 30%, acid in an amount of about 40%, and a separating agent in an amount of about 30% by weight. In a specific embodiment, sodium bicarbonate may be used alone in an amount of about 0.2% to 0.7%, preferably about 0.5% by weight.

Other conventional leavening agents can be used, including phosphates such as disodium dihydrogen pyrophosphate. These agents are typically used in an amount of about 0.1% to 3% by weight. The amount and type of leavening agent can be selected to provide the dough pieces with the ability to retain their original shape during baking so that square, triangular or other shapes can be substantially retained in the final baked product. For certain products, the leavening agent may be omitted.

Any type of flour can be used. Typically, the flour can be a cereal flour with a high or low protein content. The flour content of the sweet dough is normally from about 10% to about 60%, preferably from about 20 to about 40% and more preferably from about 27% to about 37% by weight.

The sugar that is used can be of any type. Sugars include, but are not limited to, fructose, sucrose, dextrose, corn syrup, glucose, lactose, galactose, or mixtures thereof. Preferably, sucrose is used, in the form of granulated sugar. To increase dough sweetness, a sugar substitute such as sorbitol, saccharine or any other known sugar substitute can be added either in conjunction with sugar or as a substitute for the sugar. Advantageously, sucrose helps preserve the dough during refrigeration, i.e., sucrose allows the dough to be somewhat hard, yet spread well during baking to form the desired shape. Other sugar substitutes or artificial, i.e., non-nutritive sweeteners can be used when low calorie baking products are to be made. The sugar or sugar substitute can be present in an amount from about 5% to about 50%, and preferably in an amount from about 10% to about 40% by weight.

The dough should have a moisture content from about 2 to about 25%, preferably from about 8% to about 22%, and more preferably about 12% to 16% by weight.

The type of fat has an influence on the flow capacity of the dough during baking. The fat used in the dough composition according to the invention can be a solid or liquid fat at room temperature. The fat can be of animal or plant origin, such as, lard, tallow, butter oil, butter, margarine, corn oil, copra oil, palm oil, sunflower oil, safflower oil, canola oil, soya bean oil, coconut oil, palm kernel oil, cotton oil, peanut oil, olive oil, or mixtures thereof. The fats can be emulsified or stabilized with mono- or diglycerides or other emulsifiers known in the art. For example, margarine, which already contains an emulsifier, can be used. Typically, a fat is present in an amount from about 5% to about 35%, and preferably in an amount from about 10% to about 25% by weight.

Optionally, a texturing agent can be included. One of ordinary skill in the art can determine the appropriate texturing agent with little or no experimentation. A preferred texturing agent is whole egg or egg white, liquid or dried egg powder or any egg substitute. Typically, the texturing agent can be in an amount from about 0.1% to about 10%, and preferably in an amount from about 2% to about 5% by weight.

The sweet dough according to the invention may also contain natural or artificial flavoring agents, including but not limited to, vanilla flavor, cinnamon, ginger, cocoa powder, fruit flavor, nut flavor (e.g., peanut butter or peanut flour), and the like. These are typically used in an amount of about 0.01% to about 8% by weight, and preferably from 0.25 to 7% by weight. Of course, various combinations of these flavoring agents are possible, as desired.

Optionally, the dough may contain inclusions. Inclusions include, but are not limited to, chocolate pieces, oat flake pieces, raisins, fruit pieces, whole nuts or nut pieces, i.e., groundnuts, hazelnuts or other nuts, caramel, or various mixtures thereof. The inclusions can be of any edible size, and are typically from about 1 mm to about 25 mm, preferably from about 4 mm to about 10 mm. The amount of inclusions is not critical and can vary from 1 to 30% by weight. Optionally, dark chocolate, milk chocolate, white chocolate, compound coatings or mixtures thereof may be used in the form of morsels, pellets or chunks. Typically, chocolate is present in an amount from about 5% to about 50%, and preferably in an amount from about 10% to about 30% by weight. The chocolate can be a commercial chocolate or a chocolate of the type used in pastry making or in catering.

According to the invention, the block or sheet of dough is sufficiently thick to form a cookie or other bakery product of edible size upon baking. This feature avoids further dough manipulation either by rolling or folding the dough. Typically, the sweet dough sheet has a thickness of from about 0.5 cm to about 5 cm, and preferably from about 1 cm to about 3 cm.

The block of sheet of dough is cut or broken into smaller pieces prior to baking. Preferably, the block of dough is precut into parallelepipedal blocks from about 1 cm to about 5 cm, preferably from about 3 cm to about 4 cm in size and with a thickness from about 1 cm to about 5 cm, preferably from about 1 cm to about 3 cm. If the dough is shaped into a disk or cylinder, the cylinder typically has a diameter from about 2 cm to about 8 cm, preferably from about 1 cm to about 3 cm. If the block of dough is shaped into a prismatic block, typically, the prismatic block has a thickness from about 1 cm to about 3 cm and a triangle with sides measuring from about 2 cm to about 8 cm, preferably from about 3 cm to about 6 cm.

The dough is prepared and molded and/or partially cut using conventional devices. The sheets or blocks are typically prepared to be broken into predetermined sizes using grooves, or score lines, or a combination thereof to define the shape of the individual portions to be baked. The predetermined size can be any convenient size, however, the size should be sufficiently large to provide a desired baked product. The grooves or score lines are typically made using marker rollers or any other apparatus known to those skilled in the art. Once the block is extruded, it travels along a belt conveyor or similar device, and marker rolls and knives can be used to form grooves as the block of dough passes beneath the rolls and knives. Longitudinal grooves or score lines can be provided by the marker rollers while lateral grooves or score lines are made by knives. The marker rollers and knives can be shaped or configured to match the type of groove or score line desired. For example, a v-shaped knife will provide a v-shaped groove. Optionally, either score lines, grooves, or combinations thereof can be made and one of ordinary skill in the art can configure the marker roller surfaces or knife shape to achieve the desired result. The marker rollers and certain knives can also be configured to cut the extruded dough slab into blocks of the desired size.

The groove or score line depth should be sufficient to allow the consumer to either break the blocks, as is known with typical chocolate bars, or to pull the blocks apart. A knife can be used to cut along the grooves or score lines, although this is not necessary. For a dough thickness of 3 cm, the depth of the grooves or score lines would typically be from about 1 mm to about 20 mm, and preferably from about 5 mm to about 15 mm. When grooves are present, a width of from about 1 mm to about 10 mm, preferably from about 3 mm to about 7 mm is used. When using a combination of grooves and score lines, the groove typically has a depth of from about 7 mm to about 12.5 mm and the depth of the score line is from about 12.5 mm to about 8 mm. Preferably, the groove is from about 5 mm to about 10 mm wide, and the score line is from about 1 mm to about 3 mm wide. In a preferred combination for a 3 cm thick dough block, the width of the groove is about 8 mm, the width of the score line is from about 2 mm, the depth of the groove is from about 10 mm and the depth of the score line is about 10 mm.

Alternatively, the depth and width of the grooves or score lines may be defined as a ratio or percentage of the block thickness. The groove or score line depth is generally from about 3% to about 95%, preferably from about 5% to about 75%, and more preferably from about 7.5% to about 35% of the block thickness. For certain dough products, the groove or score line depth should be about 75% of the thickness of the dough. The groove or score line width is generally about 0.5% to 50%, preferably from about 1% to about 35%, and even more preferably from about 5% to about 25% of the dough thickness. When using a combination of grooves and score lines, the depth of the grooves may be from about 5% to about 50% and the depth of the score lines from about 50% to about 25% of the block thickness. Preferably, the width of the groove is from about 10% to about 40% and the width of the score line is from about 10% to about 20% of the block thickness. As noted above, the grooves, score lines, or combinations do not cut through the entire thickness of the dough.

Advantageously, the grooves are provided in a V-like shape, a straight vertical cut which is essentially perpendicular to the cookie dough surface, or a combination of these. Other configurations such as U-shaped, rounded or rectangular grooves, can also be used if desired. The combination of grooves and score lines is particularly useful when the block of dough is made from a soft dough. Softer doughs are typically of a creamy texture and higher in moisture content. The soft dough is generally used for soft type cookies such as oatmeal or raisin cookies among others.

As the top surface of the extruded dough slab is not perfectly smooth, the depth and width of each groove and/or score line are not identical. Also, inclusions such as chocolate chips or nuts can affect the uniformity of the dimensions of the grooves or score lines. For these reasons, the values and ratios mentioned above are considered as averages.

After preparation of the grooves or score lines, and during use of the product by the consumer, individual pieces of dough can be broken off one by one, placed on a tray, and then baked in an oven. As a practical embodiment, the dough thickness may be about 2 cm for 3.5 cm×3.5 cm blocks. For a 300 g block, there would be 3×3 blocks, for a block of 400 g, 3×4 blocks and for a 500 g block 3×5 blocks. Once the smaller blocks are separated, they are arranged on an oven tray and baked. One of ordinary skill in the art with little or no experimentation can determine the appropriate baking conditions for the type of product to be made and the oven being used. For a cookie dough, baking can be carried out using a conventional oven at a temperature from about 180° C. to about 200° C. for about 12 minutes to about 18 minutes. After baking, cookies having a diameter of about 7 cm is obtained from blocks of 3.5 cm×3.5 cm. According to the invention, the dough forms substantially round cookies from blocks which are substantially square shaped.

FIG. 1 illustrates a block of cookie dough formed into a parallelepipedal shape (1) using conventional methods. Thereafter, marker rolls and knives form intersecting grooves (2) on the surface to define blocks of dough (3). The blocks of dough are then pulled apart, placed on a baking sheet, and baked in an oven to form cookies.

Figure 2C:
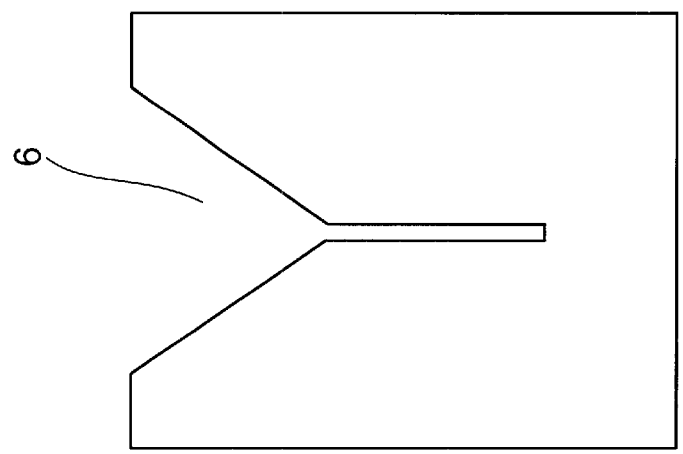
FIGS. 2a, 2b and 2c are enlarged cross-sectional views of a cookie block having score lines (2a), grooves (2b) and combinations thereof (2c)
Figure 2B:
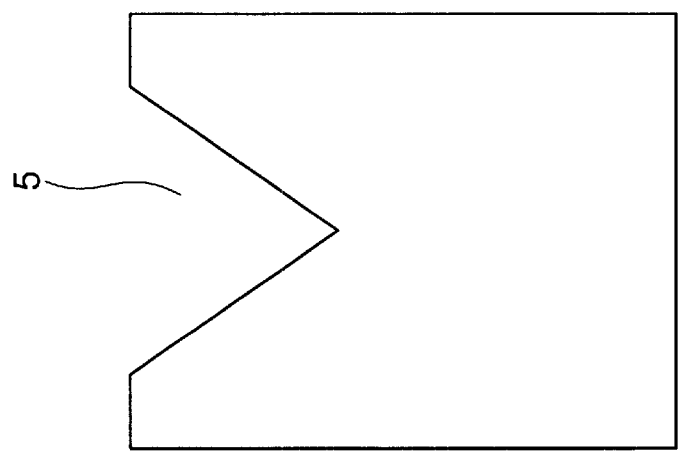
Figure 2A:
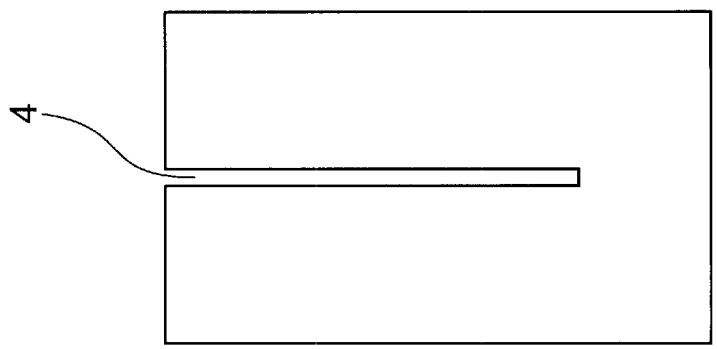

FIG. 2 is a cross sectional view of a score line (4) with a depth of about 75% and a width of about 5% of the thickness of the block of dough (FIG. 2a), a groove (5) with a depth of about 30% and a width of from about 35% to about 5% of the thickness of the block of dough (FIG. 2b), and a combination (6) wherein the groove has a depth of about 30% and a width of from about 35% to about 5% of the thickness of the block of dough and the score line has a depth of about 40% and a width of about 5% of the thickness of the block of dough (FIG. 2c).

The invention also relates to a ready-to-use bakery dough product in the form of a sheet or block which exhibits one or more of the following features:

a) at least two different layers;
b) at least two different strips for each piece taken from the block;
c) the same or a different stamping on the top of each piece;
d) the same or a different decoration on the top of each piece;
e) a filling which is different from the basic dough and is the same or different in each piece, or
f) precut forms of different specific shapes or sizes.

According to one embodiment of the invention, the block has at least two different layers. The number of layer is not critical, but from a practical point of view, the number of layers is typically between 2 and 6. Preferably, the number of layer is 2. These layers are more specifically of different compositions. This can be done for example by adding to the basic dough different types of flavors or colors, which are accepted in the food area. For example, it is possible to have the basic dough as a first layer and dough added with cocoa as the second layer, wherein the resultant cookie has both a clear face and a dark face. The way for producing this layered dough can be either by extrusion, sheeting or by other ways which are known in the art.

According to another embodiment of the invention, the block has at least two different strips for each smaller piece that is taken from the block. This number of strips is not critical, but typically would be between 2 and 6. Preferably, the number of strips is 4. If desired, these dough strips may be of different compositions. This can be done for example by adding to the basic dough different types of acceptable food grade flavors or colors. For example, it is possible to have the basic dough as first strip and a dough that contains cocoa as a second strip. The resultant cookie could then have a clear portion and a dark portion. The way for producing multiple dough strips can be the same as for the layers, i.e., by extrusion, sheeting or other ways that are known in the art. Also, the strips can be placed in adjacent relation either horizontally or vertically in the dough block. Also, two different color doughs which are swirled together to provide a marbled appearance.

According to another embodiment of the invention, each piece of the dough block is stamped on the top with a recognizable design or image, for example an animal or a geometric shape. In this case, a known stamping device is used for creating an indentation on the top of the pieces. The dough can be a classical dough in its composition since the ornamentation is visible on the top face of the cookie.

According to yet another embodiment of the invention, each piece of the block receives a decoration on the top face. This decoration can be either precisely placed or randomly put on the tops of the pieces of the block. The possible decorations are seeds, for example sesame seeds, or an icing, sugar balls, non-pariels or other decorations. The way to put the decoration on the top of the pieces can be either by a sprinkling device or by manual, robotic or mechanical means, all of which are known generally in the art.

According to another embodiment of the invention, the block of dough has a filling for each piece, which filling is different from the basic dough. This filling could be either a creamy or a liquid filling. This filling can be a sugar based confection such as caramel, chocolate, or a fruit or cream gel or viscous fluid. The filling can be also a solid filling, such as chocolate, a flavored dough or another aromatized dough. In the case of a liquid filling, it is so calculated that the filling remains inside the basic dough after cooking. The amount of the filling is not critical; it can represent from about 5 to 50% of the piece of dough. The shape of the filling is also not critical. In addition, it is possible for the dough to break during baking so that the filling can exude onto the baked dough. The way of producing a block with filling includes by coextrusion, by injection, or by placing the filling on a first dough layer and then putting a second dough layer upon the filling and first dough layer, in a manner similar to the way that ravioli is made.

Figure 3:
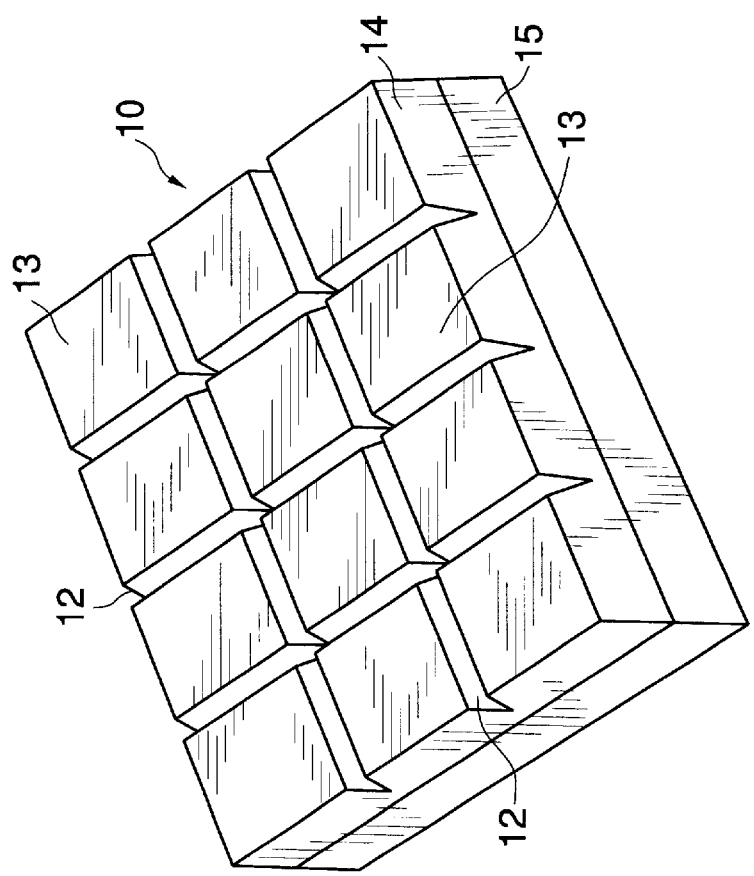
FIG. 3 is a perspective view of a bakery dough block having multiple layers in accordance with another embodiment of the invention.
Figure 4:
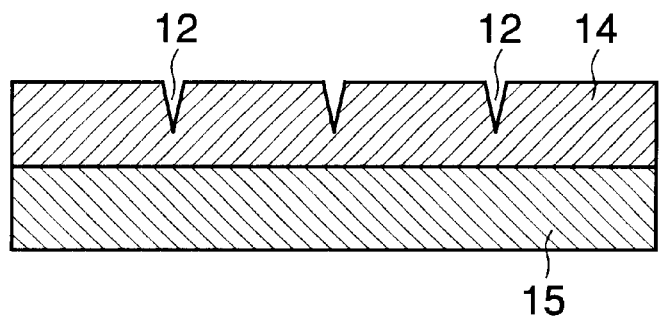
FIG. 4 is a cross sectional view of the bakery dough block of FIG. 3, viewed in a perpendicular direction to the longitudinal axis of the block.

According to FIGS. 3 and 4, the block (10) of cookie dough is prepared with the composition stated in Example 5. The preparation is made by sheeting and when the block is formed, marker rolls which make it possible to form the grooves (12) are made to pass over it. At the time of use, it is sufficient to break off one by one, the various pieces or dice (13) that are formed and to then place them on a tray to put in the oven for baking. If desired, the dice (13) that are formed with two layers: the top layer (14) made with a classical dough and the lower layer (15) made with the same dough but with the addition of cocoa.

Figure 5:
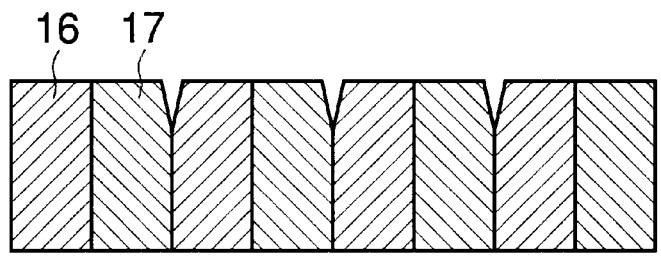
FIGS. 5 and 6 are cross-sectional views of additional embodiments of bakery dough blocks of the invention, to illustrate the use of multiple strips of fillings.

FIG. 5 illustrates a dough section having two strips (16) and (17) of different dough compositions. The dice, which has been broken from the block has these both strips (16) and (17). For example, one strip (6) may be the classical dough as before while the other strip (17) is the same dough, but with cocoa.

Figure 6:
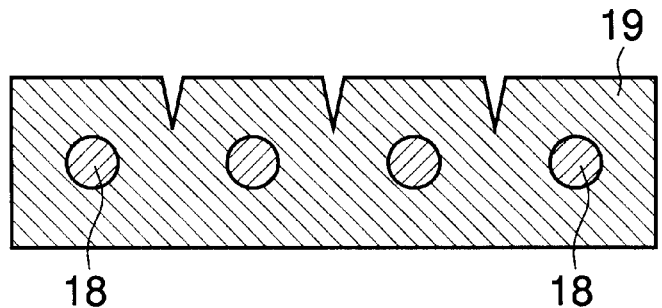

Another embodiment of the invention is shown in FIG. 6, which illustrates a section through the middle of the dice. In this case, there is a filling (18) embedded in the dough (19). The type of filling is not critical, the only condition being that filling must be capable of withstanding the baking process. Typical fillings include a fruit jam, or chocolate, or hazel nut or a mixture of chocolate and hazel nut. The ratio of dough to filling is not critical: this ratio is normally between about 30/70 and 85/15 and preferably is from 40/60 and 60/40.

Figure 7:
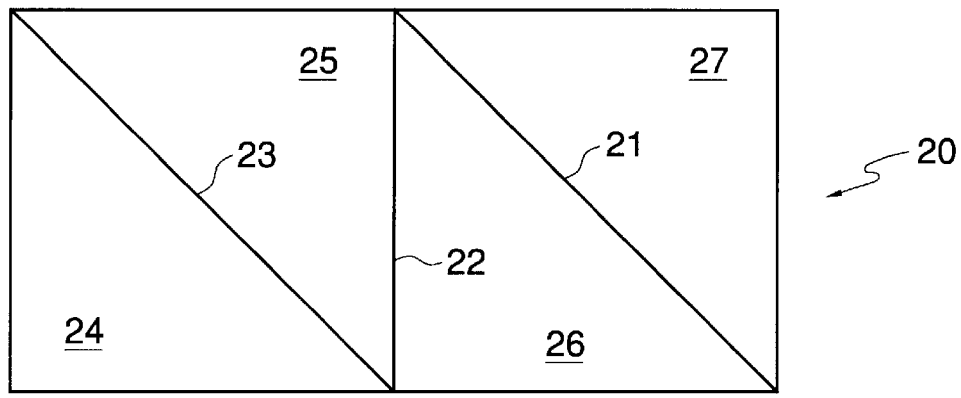
FIG. 7 is a top view of a dough sheet having score lines which, with the edges of the sheet, define triangular dough pieces that can be separated and baked.

Additional embodiments of the invention relate to a sheet of sweet dough. After preparing the sheet in a desired size, such as 4"×8" and ⅛" thick, the sheet is provided with non-intersecting score lines that define the final product to be baked. One embodiment, is illustrated in FIG. 7, where the dough sheet (20) is provided with score lines (21), (22), (23), to define four triangular dough pieces (24), (25), (26), (27), that can be broken off, folded or rolled into a final shape and then baked. Before rolling, a filling can be provided, if desired. According to yet another embodiment of the invention, the dough sheet has nested forms of different specific shapes or sizes. Thus, different shapes or sizes can be provided on the same sheet without having to recycle or reuse any part of the dough. For example, it is possible to have geometric shapes, like triangles, squares, rectangles, animal shapes, toy or cartoon character shapes or any other shapes. Advantageously, these shapes are nested or otherwise interlaced to efficiently use as much of the sheet as possible. Preferably, the entire dough sheet is divided into the shapes without any waste.

Figure 8:
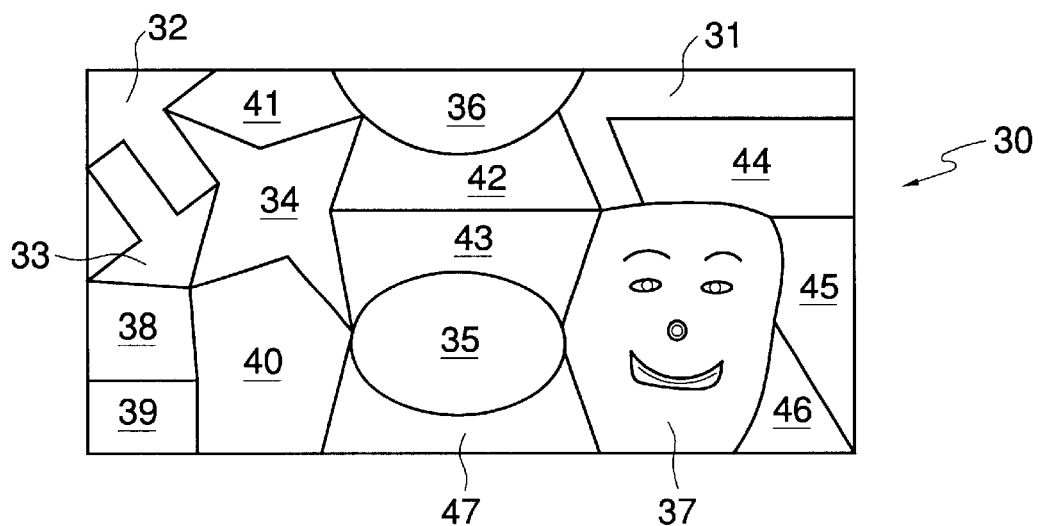
FIG. 8 is a top view of another dough sheet wherein the score lines define various geometric shapes that can be separated from the sheet and baked.

This embodiment is illustrated in FIG. 8, wherein the dough sheet (30) includes a number of different shapes of figures, geometric forms, toy characters, etc., outlined by score lines. These shapes includes a letter (31), arrows (32), (33), a star (34), an oval (35), a half circle (36), a face (37), and other random shapes (38), (39), (40), (41), (42), (43), (44), (45), (46), (47). The shapes are separated or broken off from the sheet along the score lines to form the individual portions for baking. These portions are then placed on a pan and baked as described above. The dough is formulated to retain its shape rather than to flow into a round shape during the baking process, thus retaining the shape of the figure in the final baked product. The nested configuration of the shapes conserves dough and avoids wasting or resizing dough pieces, e.g., those that could be left over after using a cookie cutter on a dough sheet.

For brownie preparation, the entire grooved block may be baked in a pan of substantially double the size: for example of a rectangle of around 11×14 cm, it is possible to use a square baking of 20×20 cm. The block is broken into defined pieces which are then distributed in the tray in a configuration where they are individually spaced apart from each other so that at the end of the baking, the pieces have joined together due to the rising and flowing effects, but the lines of separation practical for cutting into portions remain visible. Generally, the dough blocks are sized to fit in conventional brownie or cake baking pans. Various pan sizes can be used as long as the number of pieces is adapted to the pan dimensions. After the block is broken into pieces and placed in the pan, it is ready for baking under conventional conditions, such as at a temperature of about 175° C. for 20 to 40 minutes. After baking, the final product is cooked correctly. Also, the baked product includes lines where the pieces previously separated have joined together. The consumer can cut the baked product along these lines to form individual servings.

In an alternative of the invention, the grooved block is separated into a plurality of individually predetermined pieces, which are then individually positioned in individual forms, recesses or containers. These forms, recesses or containers are sized so as to leave sufficient room to enable each individual piece to rise and bake properly. This method is more directed to the preparation of small cakes, e.g., muffins or cupcakes. The pieces that are broken off or separated from a block of dough can be baked in separate pans or in pans having separate compartments (i.e., muffin or cupcake pan). The compartments assist in forming the desired final size, configuration and shape of the bakery product, while providing the dough in sheet form with score lines to define the individual pieces enables the user to quickly dispense the dough pieces into the pan compartments.

The dough sheet may be provided with a topping either before or after the score lines are made. Typical toppings include sugar powder or granules, spices, non-pariels, nuts, chocolate or fruit pieces, materials that turn into a glaze during baking, flavoring agents, toffee, caramel or the like. The final product is limited only by the imagination of the bakery product designer or formulator.

The top surface of the dough pieces may also be provided with raised or indented portions that create a shape or figure. If desired, different colors can be provided on the raised surfaces in a manner that is generally known in the dough processing art.

When fillings are provided in the dough, it is contemplated that non-dough fillings can be used. This would include ingredients, such as sugars, chocolates, puddings, ice cream, soft candy formulations, chewing gum or the like. If desired, the filling can be provided between two dough sheets. The filling can be continuous or placed only on the individual dough pieces. It is also possible to remove part of the top dough sheet or use a top dough sheet with holes so that the filling is exposed. The holes of the top dough sheet can also be provided with a desired shape or figure. Thus, a wide variety of different bakery product arrangements can be provided.

The sweet dough may be packaged in any one of a variety of ways. The block of dough can be wrapped and packaged using conventional methods. The wrapping should protect the dough from air and moisture. Typically, the wrapping is made of synthetic material or based on a cardboard or paper carton. Optionally, the dough can be frozen either prior to or after packaging. Thereafter, the dough can be stored either in a refrigerator or a freezer. The shelf life of the dough in a refrigerator is typically of several months and of several months in a typical freezer.

Also, dough sheets can be individually wrapped, or a plurality, typically between 2 and 4 sheets, can be stacked on paper or cardboard sheets before being packaged. When thin dough sheets (i.e., less than about 3 mm) are used, they may be rolled into cylinders of about 75 mm in diameter before being packaged in a round, square, rectangular or triangular container or box. This conserves space and allows for more convenient packaging and shipping of the products. For this embodiment, the consumer simply removes the rolled sheets from the container, and flattens them before separating the pieces from the sheet. When rolled frozen dough sheets or blocks are provided, the dough is allowed to thaw before attempts are made to flatten it.

EXAMPLES

The remainder of the description is made with reference to the following Examples.

Examples 1–4

The various ingredients stated in the table below are mixed. The proportions are in percentages by weight.

| EXAMPLES | 1 | 2 | 3 | 4 |
| --- | --- | --- | --- | --- |
| Sugar | 33.5 | 34 | 33.8 | 34.1 |
| Whole Egg | 3.5 | 3.5 | 3.5 | 3.5 |
| Baking Powder | 0.7 | 1 | 1.5 | 1.5 |
| Salt | 0.3 | 0.3 | 0.3 | 0.3 |
| Fat | 12.8 | 12.9 | 12.8 | 13 |
| Water | 4.4 | 3.2 | 3.2 | 2.1 |
| Flavorings | 0.6 | 0.5 | 0.6 | 0.7 |
| Flour | 28 | 28.3 | 28.1 | 28.4 |
| Chocolate pieces | 16.2 | 16.3 | 16.2 | 16.4 |

The dough prepared is stored for 3 weeks in the refrigerator and 3.5×3.5 cm blocks are then made. After baking for 16 minutes at 180° C., cookies 7 cm in diameter are obtained.

For Example 1, the dough is considered too soft, for Examples 2 and 3 it is a little soft and Example 4, the consistency is judged to be good, in the light of the possibility of manufacturing the dough on an existing production line. In the 4 cases, the dough blocks flow during baking in a manner, which results in quite circular cookies.

Example 5

The various ingredients stated in the table below are mixed, the proportions being in percentages by weight, to prepare a brownie mix.

| Component | Ex. 5 |
| --- | --- |
| Sugar | 42 |
| Egg Powder | 2 |
| Baking Powder | 0.5 |
| Shortening | 17 |
| Cocoa | 7 |
| Starch/Flour | 11 |
| Flavorings | 1 |
| Water | 13.5 |
| Chocolate pieces | 6 |

The dough is prepared and stored for as long as 6 months in the refrigerator. Pieces of a size of about 3.5×3.5 cm are broken off the block and then are placed in a greased 20×20 cm pan for baking. The breaking of the dough into pieces enables the brownie mix to fill the pan properly to facilitate baking. The pieces are baked for about 25 minutes at 170° C. The pieces enable the oven heat to surround them, and the pieces flow into each other as they bake. Although the final baked product is a single mass, it is more evenly cooked than brownie mixes that are not previously formed into a block and separated as described above.

Example 6

The various ingredients stated in the table below are mixed for making a ready-for-use cookie dough with two layers. The amounts are in weight percent.

| Example | Clear Dough | Dark Dough |
| --- | --- | --- |
| Sugar | 33.3 | 34.5 |
| Whole egg | 9.5 | 9.4 |
| Baking powder | 0.5 | 0.5 |
| Salt | 0.5 | 0.5 |
| Fat | 15 | 15.6 |
| Water | 3.1 | 3.8 |
| Flavorings | 0.1 | 0.1 |
| Flour | 38 | 33.2 |
| Cocoa |  | 2.4 |

This two-layer dough is made by sheeting or extrusion and the dough is stored up to 6 months in the refrigerator. The block is broken and the pieces are then baked in an appropriately sized baking tin or pan for 30 minutes at 175° C. to form baked brownie pieces that includes different color layers.

The concentration of sugar and flour can be adjusted to achieve the desired workability: the concentration of sugar is increased and that of flour is decreased.

Example 7

This is an example for a small cake that has a filling. The basic dough is the light dough of the preceding Example 3. The filling is an apricot jam with a dough/jam ratio of 70/30. This small cake is produced by coextrusion or another suitable technique. As before, the dough is stored in the refrigerator and then baked as in Example 3. The pieces of the block are separated along the groove lines before baking. During the baking, the dough opens and the jam flows on the top of the cake.

Example 8

This is an example with a block with different shapes according to another embodiment of the invention. The block of dough has a thickness of 3 mm and different geometrical forms. The composition is the same as for the clear dough of Example 6, but the baking powder content is 0 and the fat content is 15.5%.

In each of Examples 6–8, the resultant bakery product was found to be cooked quite uniformly.

The embodiments of the invention described above are intended to be merely exemplary, and those skilled in the art will recognize, or will be able to ascertain using no more than routine experimentation, numerous equivalents of the specific materials, procedures, and devices described herein.

What is claimed is:

1. A ready-for-use refrigerated sweet dough which is prepared from flour, sugar, a leavening agent and fat, with the dough having a thickness and a surface which includes grooves, score lines, or combinations thereof which define pieces of the dough to be broken off and baked, wherein the grooves score lines, or combinations thereof each have a depth of about 3% to about 95% of the thickness of the dough.

2. The sweet dough of claim 1, wherein the grooves, score lines, or combinations thereof have a depth of from about 5% to about 75% of the thickness of the dough.

3. The sweet dough of claim 1, in the form of a parallelepipedal, cylinder, prismatic block or polygon having a thickness of from about 0.5 to 5 cm.

4. The sweet dough of claim 1, wherein the grooves have a width of between about 0.5 to about 50% of the thickness of the dough.

5. The sweet dough of claim 1, wherein combined grooves and score lines are present.

6. The sweet dough of claim 1, in the form of a flat circular or polygonal sheet having a thickness from about 1 cm to about 3 cm.

7. The sweet dough of claim 1, further including pieces of chocolate, cereal flakes or nuts in an amount from about 5% to about 50% by weight of the dough, wherein the pieces have a size of from about 1 mm to about 10 mm.

8. The sweet dough of claim 1, wherein the flour is present in an amount from about 10% to about 60% by weight, the sugar is present in an amount from about 10% to about 50% by weight, the leavening agent is present in an amount of about 0.1 to 3% by weight, the fat is present in an amount from about 5% to about 35% by weight, with a texturizing agent is present in an amount up to about 10% by weight, and a flavoring agent is present in an amount of up to 8% by weight.

9. The sweet dough of claim 8, wherein the texturing agent comprises egg or egg white and is present in an amount of about 0.1% to about 10% by weight, the flavoring agent is present in an amount of about 0.25% to 7% by weight, the fat is a solid, semi-solid or liquid at room temperature and of animal or plant origin, and the dough has a moisture content of from about 2 to about 25%.

10. The sweet dough of claim 8, wherein the leavening agent is baking powder or baking soda.

11. The sweet dough of claim 1 wherein dough has at least two different dough layers.

12. The sweet dough of claim 1 wherein each piece includes at least two different dough strips.

13. The sweet dough of claim 1 wherein at least some of the pieces have different colors.

14. The sweet dough of claim 1 wherein at least some of the pieces have a filling therein.

15. The sweet dough of claim 1 wherein at least some of the pieces have a different filling therein.

16. The sweet dough of claim 1 wherein at least some of the pieces have different surface decorations.

17. The sweet dough of claim 1 wherein the pieces have different sizes or shapes.

18. The sweet dough of claim 1 comprising at least two different doughs swirled together.

19. The sweet dough of claim 1, wherein the grooves, score lines or combinations thereof intersect to define the dough pieces that are to be broken off and baked.

20. The sweet dough of claim 1, formulated as a cookie or brownie dough.

21. The sweet dough of claim 1, wherein the grooves are V-shaped, U-shaped, rounded or rectangular in shape.

22. The sweet dough of claim 1 wherein the grooves, score lines or combinations thereof define pieces of dough which are substantially equal in size.

* * * * *

UNITED STATES PATENT AND TRADEMARK OFFICE
CERTIFICATE OF CORRECTION

PATENT NO.   : 6,413,563 B1
DATED        : July 2, 2002
INVENTOR(S)  : Blaschke et al.

It is certified that error appears in the above-identified patent and that said Letters Patent is hereby corrected as shown below:

<u>Title page, Item [54] and Column 1, line 1,</u>
Change "READY-TO-BRAKE REFRIGERATED SWEET DOUGH" to
-- READY-TO-BAKE REFRIGERATED SWEET DOUGH --.
Item [63], Related U.S. Application Data, delete the current text and substitute the following: -- Continuation of application No. 09/453,914, filed on April 25, 2000, now Pat. No. 6,280,783, which is a continuation-in-part of each of (1) PCT/EP99/05821, filed on Aug. 9, 1999; (2) application No. 09/433,557, filed on Nov. 4, 1999, now Pat. No. 6,312,743, which is a continuation-in-part of PCT/EP98/03848, filed on Jun. 24, 1998, now abandoned; and (3) application No. 09/502,447, filed on Feb. 11, 2000, now Pat. No. 6,284,295, which is a continuation-in-part of application No. 09/130,117, filed on Aug. 6, 1998, now Pat. No. 6,024,997, which is a continuation of PCT/EP97/07190, filed on Dec. 17, 1997, now abandoned. --

Signed and Sealed this

Twenty-second Day of October, 2002

*Attest:*

*Attesting Officer*

JAMES E. ROGAN
*Director of the United States Patent and Trademark Office*